United States Patent
Ackerstein Klein

(10) Patent No.: US 8,485,580 B2
(45) Date of Patent: Jul. 16, 2013

(54) APPARATUS FOR PROTECTING A CHILD'S HEAD

(76) Inventor: Sarah Ackerstein Klein, Silver Spring, MD (US)

(*) Notice: Subject to any disclaimer, the term of this patent is extended or adjusted under 35 U.S.C. 154(b) by 0 days.

(21) Appl. No.: 13/152,513

(22) Filed: Jun. 3, 2011

(65) Prior Publication Data

US 2011/0298237 A1    Dec. 8, 2011

Related U.S. Application Data

(60) Provisional application No. 61/396,855, filed on Jun. 3, 2010.

(51) Int. Cl.
*B60J 9/00* (2006.01)
*B60P 7/16* (2006.01)

(52) U.S. Cl.
USPC .............. 296/1.04; 296/187.05; 280/730.2; 410/119

(58) Field of Classification Search
USPC ............. 296/187.05, 1.04, 1.08, 193.06, 191, 296/39.1, 70; 280/730.2, 728.2, 728.3
See application file for complete search history.

(56) References Cited

U.S. PATENT DOCUMENTS

| | | | |
|---|---|---|---|
| 4,040,664 A | 8/1977 | Tanaka et al. | |
| 4,500,135 A | 2/1985 | Kincheloe | |
| 4,591,208 A | 5/1986 | McDonald et al. | |
| 5,332,292 A | 7/1994 | Price et al. | |
| 5,431,515 A * | 7/1995 | Sansone et al. | 410/119 |
| 5,468,047 A | 11/1995 | Goor et al. | |
| 5,480,181 A * | 1/1996 | Bark et al. | 280/730.2 |
| 5,556,162 A | 9/1996 | Raffini | |
| 6,079,735 A * | 6/2000 | Fallmann et al. | 280/730.2 |
| 6,454,500 B1 * | 9/2002 | Shetty | 410/119 |
| 6,508,487 B2 * | 1/2003 | Koster | 280/730.2 |
| 6,517,110 B1 * | 2/2003 | Butters et al. | 280/749 |
| 6,612,611 B1 * | 9/2003 | Swann et al. | 280/730.2 |
| 7,008,155 B2 * | 3/2006 | Smith et al. | 410/119 |
| 7,125,069 B2 * | 10/2006 | Cacucci et al. | 296/190.03 |
| 7,695,003 B2 * | 4/2010 | Feller et al. | 280/730.2 |
| 7,980,799 B1 * | 7/2011 | Rioux et al. | 410/119 |

* cited by examiner

*Primary Examiner* — Glenn Dayoan
*Assistant Examiner* — Sunsurraye Westbrook
(74) *Attorney, Agent, or Firm* — Kelley Drye & Warren LLP

(57) ABSTRACT

The present invention relates to a device for protecting the head of a child from bumps against the roof and rear door-frame of a vehicle as the child is placed in the child safety seat or removed from it.

21 Claims, 2 Drawing Sheets

APPARATUS FOR PROTECTING A CHILD'S HEAD

CROSS-REFERENCE TO RELATED APPLICATIONS

The present application relates to, and claims the priority of, U.S. Provisional Patent Application Ser. No. 61/396,855, filed Jun. 3, 2010.

FIELD OF THE INVENTION

The present invention relates to a device for protecting the head of a child from impacting the rigid, and potentially rough and/or sharp edge of the doorframe of a vehicle as the child is placed in the vehicle or removed from it.

BACKGROUND OF THE INVENTION

Infants, toddlers, and children while riding in moving vehicles, such as cars and trucks, are required by law to ride in child safety seats, which might also be known as car seats or booster seats. An example of a child safety seat is provided by the disclosure of Tanaka et al., U.S. Pat. No. 4,040,664 (November 1977), which is incorporated herein by reference. The child safety seats are generally attached to the rear seat of the vehicle and may be positioned and held on a vehicle's seat by, for example, passing the normal lap safety belt about the child safety seat and, in effect, buckling the child safety seat in place on the rear seat just as a passenger would buckle himself into the vehicle seat. The child safety seat may be anchored to the rear seat of the vehicle facing forward or rearward, depending on the age, size of the child, and the local laws of the jurisdiction where the vehicle is used.
vehicle is used.

The child safety seat may elevate the child from the seating surface of the rear seat. The elevated position of the child in the child safety seat may reduce the clearance between the child's head and the interior roof of the vehicle. This reduced clearance between the head of the child and the roof interior of the vehicle may increase the probability of striking or bumping the child's head against the door frame of the vehicle, the roof of the vehicle, or the rear passenger roof handle of the vehicle while removing or placing the child in the child safety seat.

Moreover, some maneuvering may inevitably be required to place the child in the child safety seat or remove the child from the child safety seat. This maneuvering may result in the child's head striking the door frame, the roof of the vehicle, or the rear passenger roof handle of the vehicle. These bumps are especially difficult to avoid if the child squirms during the process of placing them in or removing them from the child safety seat. These bumps are disconcerting for the parents, and may be distressing and injurious to the child. A sleeping child whose head is bumped may awaken, or an unruly child may become even more unruly after her head is bumped in this manner. Accordingly, there is a need for a device that protects the head of a child from bumps against the roof and rear doorframe of a vehicle as the child is placed in a child safety seat or removed from it.

The use of passive restraint protective barriers, such as air bags or air curtains, for protecting children riding in the rear seat of a vehicle have previously been disclosed and have also been implemented into numerous vehicles. Generally, air bag or air curtain systems are stored in deflated condition in storage areas within the vehicle. These air bag or air curtain systems may also include sensors located at various points in the vehicle, which may trigger, inflate, and then deploy the air bag or air curtain upon impact. These air bags or air curtains are not suitable for preventing the head of a child from bumping against a rigid roof or door frame of a vehicle because these passive restraint systems are only deployed during an accident. At all other times these air bag and air curtain systems are stored in folded and deflated condition. The air bags or air curtains require a triggering mechanism to deploy as a protective barrier during emergencies and are expensive and non-reusable, so they are unavailable when the child is being placed in or removed from the child safety seat in the regular course of vehicular use. Moreover, rather than protect the head of the child, these air bag or air curtain are notorious for causing injury due to the force with which they inflate and deploy.

Devices for protecting children located in child safety seats have been disclosed in various other U.S. patents. These devices, however, do not disclose an apparatus for protecting the head of a child from bumps against the roof and rear doorframe of a vehicle as the child is placed in the child safety seat or removed from it. For example, McDonald et al, U.S. Pat. No. 4,591,208 (May 1986), discloses a child car seat having an integrated safety shield placed over the front portion of the seat. The device disclosed in McDonald '208 does not protect the head of a child from bumps against the roof and rear doorframe of a car as the child is placed in the child safety seat or removed from it. Rather, the device disclosed in McDonald '208 utilizes an energy-absorbing device that is attached to the child car seat for protecting the child when the vehicle is brought to a sudden stop or is involved in a collision. Moreover, McDonald '208 device requires a special design child car seat formed to receive the safety shield. The safety shield disclosed by McDonald '208 requires the safety shield and the child car seat to have reciprocating parts, thereby requiring the consumer to buy a particular seat should the consumer also desire the safety shield.

Price et al., U.S. Pat. No. 5,332,292 (July 1994), discloses a portable cushion for a child car seat which maintains the child in an upright position and protects the child in case of injury, but fails to disclose a device for preventing the head of a child from bumping against the roof and rear doorframe of a vehicle. Rather, the positioning of the cushion in Price '292 increases the difficulty of placing or removing the child from a child safety seat. Instead, the maneuvering required when using the Price '292 device increases the probability that the child's head will strike the doorframe, the roof of the vehicle, or the rear passenger roof handle of the vehicle while placing or removing the child from a child safety seat.

Kincheloe, U.S. Pat. No. 4,500,135 (February 1985) discloses an infant car seat having a structure that folds upward to cushion the impact in the event of a crash. Kincheloe '135,however, fails to disclose a device for preventing the head of a child from bumping against the roof and rear doorframe of a vehicle when the vehicle door is open, and increases the difficulty of placing the child in or removing the child from a child safety seat. The maneuvering required in using the Kincheloe '135 device increases the probability that the child's head will strike the door frame, the roof of the vehicle, or the rear passenger roof handle of the vehicle while placing the child in or removing the child from a child safety seat.

Raffini, U.S. Pat. No. 5,556,162 (September 1996) discloses a child car seat protection device which forms a frame placed over a child car seat and includes a padded bar positioned in front of the child for protection during an accident and Goor et al., U.S. Pat. No. 5,468,047 (November 1995), discloses a child safety seat with integrated support bars designed to help prevent intrusion of an air bag into the child when the child car seat is placed in a rearward direction. Neither Raffini '162 nor Goor '047 discloses a device removably connected to a vehicle for preventing the head of a child from bumping against the roof and rear doorframe of a vehicle. Instead, the Raffini '162 and Goor '047 devices increase the difficulty of placing or removing a child into and from a child safety seat. Both of these devices disclose attachments and/or extensions to the car seat that increase the difficulty of placing or removing the child into and from a child safety seat. In fact, the additional maneuvering required to use either the Raffini '162 device or the Goor '047 device increases the probability that the child's head will strike the doorframe, the roof of the vehicle, or the rear passenger roof handle of the vehicle while placing or removing the child from a child safety seat.

Thus, the prior art lacks a device that is capable of being removably attached to a vehicle so as to cushion the impact of the head of a child with a vehicle door frame or roof as the child is placed into or removed from a child safety seat in the vehicle. Various embodiments of the present invention, but not necessarily all, address this need and provide a device for protecting the head of a child from bumping against the roof and/or door frame of a vehicle as the child is placed in the vehicle or removed from it. The present invention discloses the use of a removable cushioning device that is attached to the vehicle so that the vehicle door frame is shielded when the vehicle door is open and a child is entering the vehicle.

SUMMARY OF THE INVENTION

Responsive to the foregoing challenges, Applicant has developed an innovative removable cushioning device for preventing an un-cushioned impact between the head of a child and a vehicle door frame, the cushioning device being adapted to be removably connected to a vehicle so that an upper portion of the vehicle door frame is shielded when a vehicle door is open, said cushioning device comprising: an elongated internal flexible impact absorbing member of a length sufficient to extend along a substantial portion of the vehicle door frame; and a flexible cover surrounding said impact absorbing member, said flexible cover including means for removably connecting the cushioning device to the vehicle so that the cushioning device shields the vehicle door frame when the vehicle door is open.

Applicant has further developed an innovative removable cushioning device for preventing an un-cushioned impact between the head of a child and a vehicle door frame, the cushioning device being adapted to be removably connected to a vehicle so that an upper portion of a vehicle door frame is shielded when a vehicle door is open, said cushioning device comprising: a first elongated internal flexible impact absorbing member of a length sufficient to extend along an upper portion of the vehicle door frame; a second elongated internal flexible impact absorbing member of a length sufficient to extend along a side portion of the vehicle door frame; and a flexible cover surrounding said first and second internal flexible impact absorbing members, said flexible cover including means for removably connecting the cushioning device to the vehicle so that the cushioning device shields the vehicle door frame when the vehicle door is open.

Applicant has still further developed a removable cushioning device for preventing an un-cushioned impact between the head of a child and a vehicle door frame, the cushioning device being adapted to be removably connected to a vehicle so that an upper portion of the vehicle door frame is shielded when a vehicle door is open, said cushioning device comprising: a substantially air-tight bladder adapted to be inflated with air; a valve provided on the bladder to regulate the introduction and removal of air from the bladder; and means for removably connecting the cushioning device to the vehicle so that the cushioning device shields the vehicle door frame when the vehicle door is open.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference characters refer to like elements.

DETAILED DESCRIPTION OF EMBODIMENTS OF THE INVENTION

A removable cushioning device may prevent the head of a child from the impact with the roof and/or rear doorframe of a vehicle as the child is placed in or removed from the vehicle, and particularly in or from a child safety seat. Removable cushioning devices constructed in accordance with the various embodiments of the present invention may protects the child's head by virtue of having a cushioning device in the form of a cushioning device removably affixed to the roof or doorframe of the vehicle. In a preferred embodiment, the cushioning device may be affixed to the interior portion of the roof of the vehicle that is adjacent to the rear doorframe. The cushioning device may be installed adjacent to the rear doorframe such that the door can be operated without any interference. As described in detail below, FIGS. 1-6 show embodiments of the apparatus for protecting a child's head when being placed in or removed from a vehicle.

Figure 1:
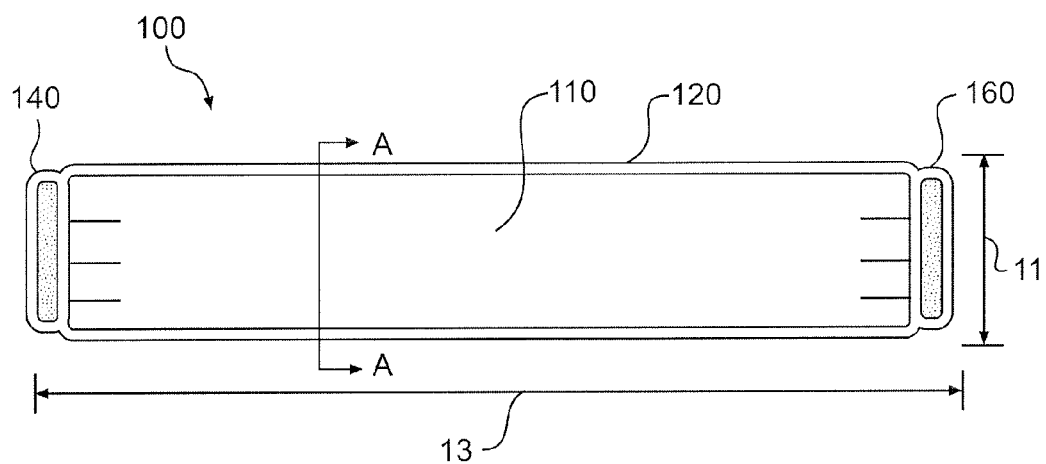
FIG. 1 is top view of a removable cushioning device constructed in accordance with an embodiment of the present invention.

Reference will now be made in detail to a first embodiment of the present invention, an example of which is illustrated in the accompanying drawings. With reference to FIG. 1, the cushioning device 100 may comprise an elongated internal flexible impact absorbing member 110 and a flexible cover 120 surrounding the impact absorbing member. The cushioning device 100 may have a lengthwise dimension 13 that is greater than a widthwise dimension 11 and sufficient to extend along a substantial portion (i.e., more than half) the upper portion of the doorframe 200 shown in FIG. 2. Preferably, the thickness of the cushioning device 100 is sufficient to absorb the impact of a child's head with the doorframe without causing the child undue discomfort. The thickness of the cushioning device 100 is more preferably at least one inch.

The flexible cover 120 may completely envelop or partially envelop the impact absorbing member 110. The flexible cover 120 may stretch fit over the impact absorbing member 110 and may include a zipper, Velcro (i.e., hook and loop), snap, button, or other fastener incorporated into it in order to permit it to cover the impact absorbing member without slipping off. The flexible cover 120 is preferably made of non-abrasive, soft, flexible material, which will not injure the head of a child. For example, the flexible cover 120 may be made of any material, such as, without limitation, fabrics, rubber films, or plastic films. The flexible cover 120 may be filled fully, or partially, with the impact absorbing member 110. Preferably, the flexible cover 120 may be washable, and may have a decorative outer surface that is particularly pleasing to children. In the embodiment shown in FIGS. 1 and 2, the flexible cover 120 may have a first end portion 140 and a second end portion 160. These end portions, 140 and 160, may be tapered as shown, or non-tapered.

Figure 2:
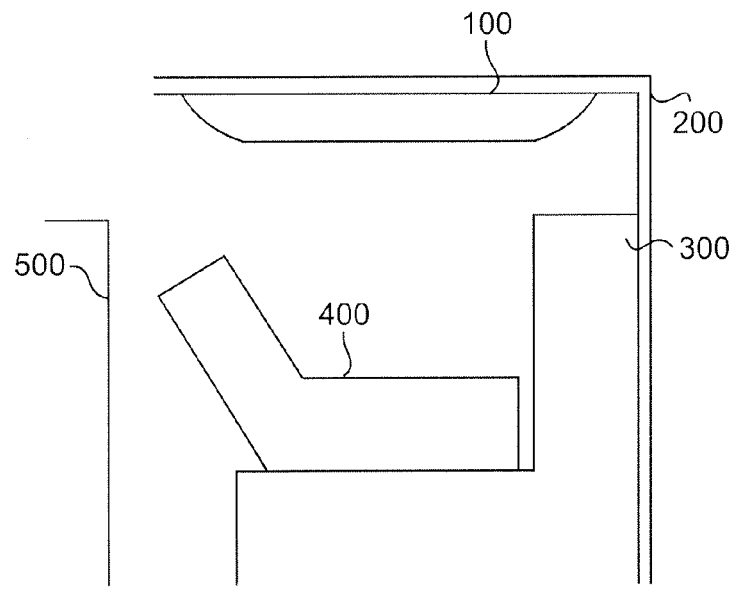
FIG. 2 is a side view of a removable cushioning device constructed in accordance with an embodiment of the present invention after being placed along a vehicle door frame.

With continued reference to FIGS. 1 and 2, the impact absorbing member 110 may fill the interior of the flexible cover 120. The impact absorbing member 110 may comprise a single piece of material, multiple pieces of material, or even stuffing material, such as, without limitation, lose cotton, lose polyester, down feathers, or foam.

Figures 3, 4:
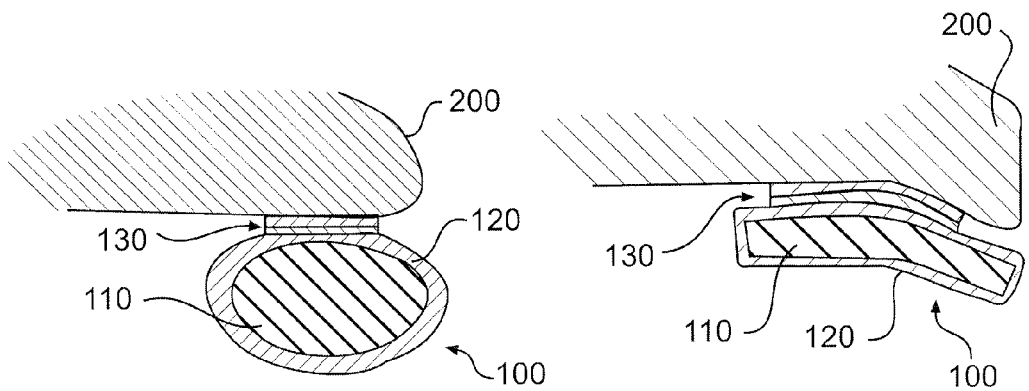
FIG. 3 is a cross-sectional view of a removable cushioning device having a round or oval cross-section taken along cut line A-A in FIG. 1.
FIG. 4 is a cross-sectional view of a removable cushioning device having a rectangular cross-section taken along cut line A-A in FIG. 1.
Figure 5:
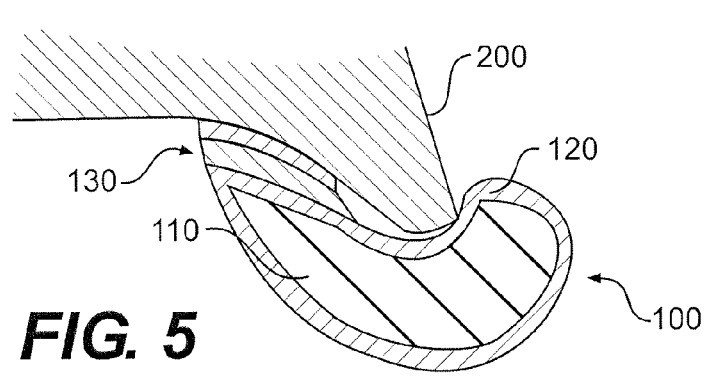
FIG. 5 is a cross-sectional view of a removable cushioning device having an irregular or concave cross-section taken along cut line A-A in FIG. 1.

The size and shape and amount of material making up the impact absorbing member 110 may vary without departing from the intended scope of the present invention. For example, the impact absorbing member may cause the cushioning device 100 to assume a particular cross-sectional shape, such as one of those shown in FIGS. 3-5 which are taken along cut line A-A of FIG. 1. With reference to FIG. 3, the impact absorbing member 110 may have a round or oval shape, and may be placed to optionally extend slightly beyond the door frame 200 when the vehicle door is open. With reference to FIG. 4, the impact absorbing member 110 may have a rectangular cross-sectional shape and may be placed to optionally extend just to the outer most portion of the doorframe 200. With reference to FIG. 5, the impact absorbing member 110 may have an irregular or concave shape which permits it to somewhat surround the doorframe to further prevent unwanted impacts between a child's head and an un-cushioned doorframe surface.

Each of the embodiments of the present invention shown in FIGS. 3-5 also show that the flexible cover 120 may include a means 130 for removably connecting the cushioning device 100 to the vehicle roof interior and/or doorframe 200. The cushioning device 100 may be removably attached to the roof of the vehicle and adjacent to the rear doorframe with any generally available reusable attaching means 130, such as Velcro, adhesive tape, magnets, clips, snaps, straps, pins, or other attaching mechanisms. In the exemplary embodiments shown in FIGS. 3-5, Velcro attachment members 130 are used to removably attach the cushioning device 100 to the roof of the vehicle. For example, two two-inch long strips by half-inch wide of Velcro is fixedly attached to the flexible cover 120 of the cushioning device 100. Matching locking strips of Velcro are then attached to the roof of the vehicle near the rear doorframe where the cushioning device 100 is desired to be installed. The Velcro strips on the cushioning device 100 are then pressed on to the locking strips of Velcro attached to the roof of the car to removably attach the cushioning device 100 to the roof of the vehicle.

In an alternative embodiment, the flexible cover 120 of the cushioning device 100 may be made of an inflatable plastic or rubber material, such as the material of the inflatable rubber bladder made by Monarch Rubber, and the impact absorbing member 110 may comprise air inside the bladder. Alternatively, the flexible cover may be provided over a bladder to provides the impact absorbing member 110. If the cushioning device 100 is inflatable, the bladder may be provided with an inflation valve to regulate the introduction and removal of air from the bladder. In another alternative embodiment, the impact absorbing member 110 may be made from foam rubber material such as one or two-pound foam made by Reilly Foam Co., Conshohocken, Pa. As noted above, the cushioning device 100 may have various shapes, sizes, and orientations without departing from the intended scope of the present invention.

As shown in FIG. 2, the child safety seat 400 may be removably affixed to the rear seat 300 of the vehicle and may be placed behind the front seat 500 of the vehicle. The child safety seat 400 may be either front-facing or rear-facing, as shown in FIG. 2. The cushioning device 100 may be removably attached to the portion of the roof of the vehicle that is adjacent to the rear doorframe 200 of the vehicle such that the cushioning device 100 may prevent un-cushioned impact between the head of the child and the rear doorframe of the vehicle, the roof of the vehicle, or the rear passenger roof handle of the vehicle while the child is removed or placed in the child safety seat 400. The cushioning device 100 may be attached adjacent to the doorframe of the vehicle such that it does not interfere with the operation of the rear door of the vehicle. While placing or removing the child from the child safety seat, if the head of the child comes close to the roof of the vehicle or the doorframe, the cushioning device 100 may cushion any impact with the head of the child.

Figure 6:
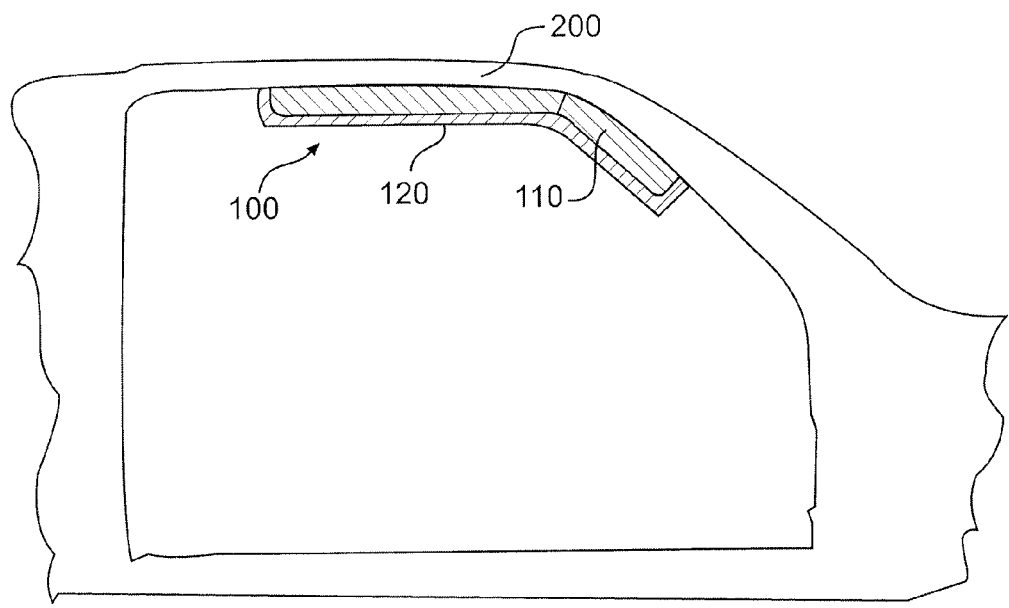
FIG. 6 is a side view of a removable cushioning device having two elongated internal flexible impact absorbing members and constructed in accordance with an embodiment of the present invention after being placed along a vehicle door frame.

With reference to FIG. 6, in still another alternative embodiment of the present invention, the impact absorbing member 110 may be bifurcated or bendable so that the cushioning device 100 covers part or all of the rear inclined portion of the vehicle doorframe 200.

It will be apparent to those skilled in the art that variations and modifications of the present invention can be made without departing from the scope or spirit of the invention. For example, size shape and materials may be changed without departing from the intended scope of the invention and appended claims. It is further appreciated that forming one or more elements of the apparatus embodiments of the present invention integrally as opposed to separately is intended to fall within the scope of the invention and appended claims.

What is claimed is:

1. A removable cushioning device for preventing an un-cushioned impact between the head of a child and a vehicle door frame, the cushioning device being removably connected to a vehicle so that an upper portion of the vehicle door frame is shielded when a vehicle door is open, said cushioning device comprising:

an elongated internal flexible impact absorbing member extending along a substantial portion of the vehicle door frame; and a flexible cover surrounding said impact absorbing member, said flexible cover including means for removably connecting the cushioning device to the upper portion of the vehicle door frame so that the cushioning device contacts and shields a substantial portion of the vehicle door frame when the vehicle door is open.

2. The removable cushioning device of claim 1, wherein the means for connecting comprises a hook and loop fastener having a first hook or loop portion attached to the vehicle interior roof and a second hook or loop portion attached to the flexible cover.

3. The removable cushioning device of claim 1, wherein the means for connecting comprises a means selected from the group consisting of: snap, adhesive, magnetic, clip, and pin means.

4. The removable cushioning device of claim 1, wherein the elongated internal flexible impact absorbing member has first and second tapered end portions.

5. The removable cushioning device of claim 1, wherein the elongated internal flexible impact absorbing member has a first tapered end portion and a second un-tapered end portion.

6. The removable cushioning device of claim 1, wherein the elongated internal flexible impact absorbing member has an oval cross-sectional shape.

7. The removable cushioning device of claim 1, wherein the elongated internal flexible impact absorbing member has a rectangular cross-sectional shape.

8. The removable cushioning device of claim 1, wherein the elongated internal flexible impact absorbing member has a concave cross-sectional shape, said concave shape enveloping a portion of the vehicle door frame.

9. The removable cushioning device of claim 1, wherein the elongated internal flexible impact absorbing member extends beyond an outer edge of the vehicle door frame.

10. The removable cushioning device of claim 1, wherein the elongated internal flexible impact absorbing member has a thickness of at least one inch.

11. The removable cushioning device of claim 1, wherein the elongated internal flexible impact absorbing member comprises foam material.

12. The removable cushioning device of claim 1, wherein the elongated internal flexible impact absorbing member comprises:
a substantially air-tight bladder adapted to be inflated with air; and
a valve provided on the bladder to regulate the introduction and removal of air from the bladder.

13. The removable cushioning device of claim 1, wherein the flexible cover is easily removable from the elongated internal flexible impact absorbing member.

14. The removable cushioning device of claim 13, wherein the flexible cover is washable in a home washing machine.

15. A removable cushioning device for preventing an un-cushioned impact between the head of a child and a vehicle door frame, the cushioning device being removably connected to a vehicle so that an upper portion of a vehicle door frame is shielded when a vehicle door is open, said cushioning device comprising:
a first elongated internal flexible impact absorbing member extending along and contacting a substantial portion of an upper portion of the vehicle door frame;
a second elongated internal flexible impact absorbing member extending along and contacting a substantial portion of a side portion of the vehicle door frame; and
a flexible cover surrounding said first and second internal flexible impact absorbing members, said flexible cover including means for removably connecting the cushioning device to the vehicle so that the cushioning device shields and contacts the vehicle door frame when the vehicle door is open.

16. The removable cushioning device of claim 15, wherein the means for connecting comprises a means selected from the group consisting of: hook and loop, snap, adhesive, magnetic, clip, and pin means.

17. The removable cushioning device of claim 15, wherein the elongated internal flexible impact absorbing member has a thickness of at least one inch.

18. The removable cushioning device of claim 15, wherein the elongated internal flexible impact absorbing member comprises foam material.

19. The removable cushioning device of claim 15, wherein the elongated internal flexible impact absorbing member comprises:
a substantially air-tight bladder adapted to be inflated with air; and
a valve provided on the bladder to regulate the introduction and removal of air from the bladder.

20. The removable cushioning device of claim 15, wherein the flexible cover is easily removable from the first and second elongated internal flexible impact absorbing members.

21. A removable cushioning device for preventing an un-cushioned impact between the head of a child and a vehicle door frame, the cushioning device removably connected to a vehicle so that an upper portion of the vehicle door frame is shielded when a vehicle door is open, said cushioning device comprising:
a substantially air-tight bladder inflated with air, said bladder extending along a substantial portion of the vehicle door frame and in contact with a substantial portion of said vehicle door frame when inflated;
a valve provided on the bladder to regulate the introduction and removal of air from the bladder; and
means for removably connecting the cushioning device to the vehicle so that the cushioning device shields the vehicle door frame when the vehicle door is open.

* * * * *